(12) United States Patent
Ciecko

(10) Patent No.: US 9,723,440 B2
(45) Date of Patent: Aug. 1, 2017

(54) PRIORITIZED ACTIVITY BASED LOCATION AWARE CONTENT DELIVERY SYSTEM

(71) Applicant: Brendan Ciecko, Boston, MA (US)

(72) Inventor: Brendan Ciecko, Boston, MA (US)

(73) Assignee: CUSEUM, Inc., Boston, MA (US)

( * ) Notice: Subject to any disclaimer, the term of this patent is extended or adjusted under 35 U.S.C. 154(b) by 0 days.

(21) Appl. No.: 15/240,039

(22) Filed: Aug. 18, 2016

(65) Prior Publication Data

US 2017/0055121 A1   Feb. 23, 2017

Related U.S. Application Data

(60) Provisional application No. 62/206,992, filed on Aug. 19, 2015.

(51) Int. Cl.
*H04W 24/00* (2009.01)
*H04W 4/02* (2009.01)
*H04W 4/04* (2009.01)

(52) U.S. Cl.
CPC ............ *H04W 4/021* (2013.01); *H04W 4/02* (2013.01); *H04W 4/04* (2013.01)

(58) Field of Classification Search
CPC ............... G06Q 30/02; G06Q 30/0269; G06Q 30/0267; G06Q 10/0833; G06Q 30/0261; G06Q 30/0255; G06Q 30/0251; G06Q 30/0205; G06F 17/30867; G06F 17/30761; G06F 17/30241; G06F 17/3087; H04W 4/02
USPC ......................................................... 455/456.3
See application file for complete search history.

(56) References Cited

U.S. PATENT DOCUMENTS

2013/0150091 A1* 6/2013 Ingram .................... G08G 1/20
455/456.3
2013/0267207 A1* 10/2013 Hao ....................... H04L 67/306
455/414.1

* cited by examiner

*Primary Examiner* — Kwasi Karikari
(74) *Attorney, Agent, or Firm* — Robert Schuler

(57) ABSTRACT

An activity based, location aware content delivery system runs a content delivery process that operates to detect a current location of a mobile device user, and to identify a first instance of content corresponding to the current mobile device location. The instance of content is used to identify a priority activity the mobile device user was previously engaged in at another location that has a pointer to a second instance of media content that is sent to the mobile device user.

10 Claims, 9 Drawing Sheets

CONTENT DELIVERY SYSTEM
100

FIG.4A   INDOOR OBJECT LOCATION MAP 310A

| BEACON ID | OBJECT/VENUE ID |
|---|---|
| B.1 | OBJ.100 |
| B.2 | OBJ.101 |
| B.3 | OBJ.109 |
| . | . |
| . | . |
| B.100 | OBJ.200 |

ACCESS BY SEL. LOGIC

FIG.4B   OUTDOOR OBJECT LOCATION MAP 310B

| GPS COORDINATES | OBJECT/VENUE ID |
|---|---|
| LAT./LONG. | OBJ.100 |
| LAT./LONG. | OBJ.101 |
| . | . |
| . | . |
| LAT./LONG. | OBJ.200 |

ACCESS BY SEL. LOGIC

FIG.4C   INDOOR/OUTDOOR OBJECT LOCATION MAP 132C

| CAPTURED IMAGES | OBJECT ID |
|---|---|
| IMAGE.00 | OBJ.100 |
| IMAGE.01 | OBJ.101 |
| . | . |
| . | . |
| IMAGE.NN | OBJ.200 |

ACCESS BY SEL. LOGIC

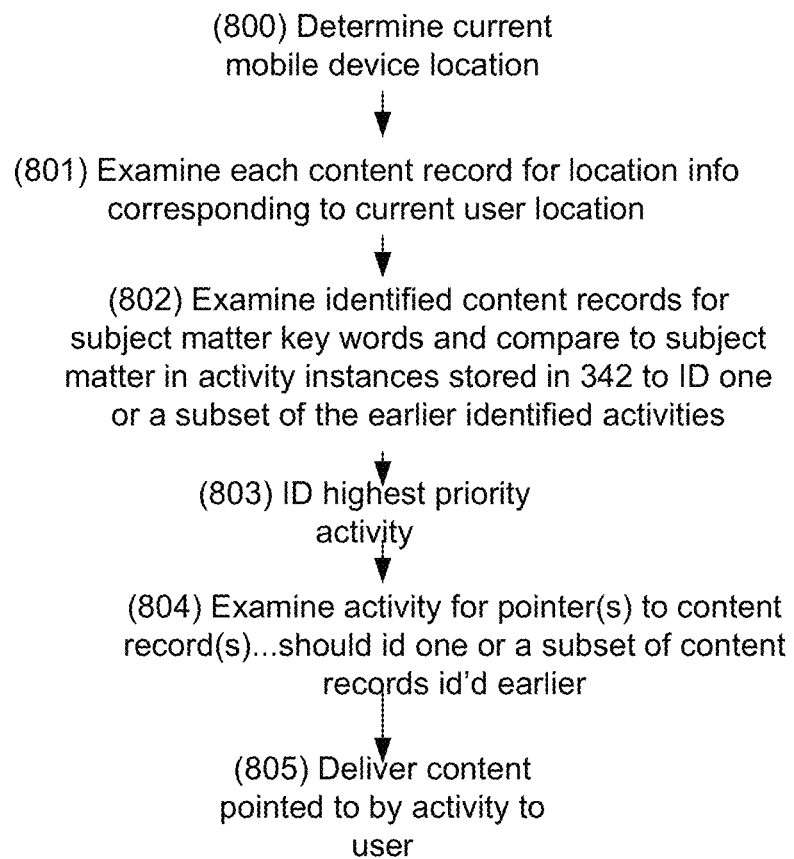

FIG. 9A

```
USER ACTIVITY INSTANCE 900

LOCATION INFO.
OBJECT/VENUE INFO.
TIME STAMP
MOVEMENT INFO.
USER INTERACTION WITH APP.
POINTER TO CONTENT RECORD
```

FIG. 9B

```
CONTENT RECORD N

RECORD ID
GEOGRAPHIC LOCATION
SUBJECT MATTER
```

PRIORITIZED ACTIVITY BASED LOCATION AWARE CONTENT DELIVERY SYSTEM

1. FIELD OF THE INVENTION

The present disclosure relates generally to the delivery of media content based upon a prioritized mobile communication device user activity.

2. BACKGROUND

With the proliferation of wireless connectivity to networks that permit access to information stored in association with computational devices (i.e., servers) connected to these networks, a very large number of applications (mobile applications) are being developed that are compatible to run on mobile communication devices. During the time that a mobile device is connected to a wireless network, a user of the device is able to search for and down-load information that they are interested in, and which is germane to their current geographic location. At some point, network developers and mobile communication device developers realized that implementing geographic positioning system (GPS) functionality in a mobile communication device allowed the current location of a mobile device to be easily tracked, and this current geographic position information could be used as the basis for identifying information to be delivered to the mobile device that relates to the current location of the mobile device. Such location based information delivery applications (Location Aware Content Delivery) can be configured to request or pull location dependent content from a network, or these applications can be configured to automatically accept certain type of content that is of interest to the device user. Regardless of the method, the delivery of information to a mobile device based upon the current location of that device was a step forward in the development of mobile application functionality.

3. BRIEF DESCRIPTION OF THE DRAWINGS

The present invention can be best understood by reading the specification with reference to the following figures, in which:

FIG. 4A is a diagram showing an indoor object location map 310A.

FIG. 4B is a diagram showing an outdoor object location map 310B.

FIG. 4C is a diagram showing an location map 132C.

FIG. 8 is a diagram illustrating a logical process 352 running in association with the content delivery module 300.

FIG. 9A is a diagram showing elements comprising an instance of a user activity.

FIG. 9B is a diagram showing elements comprising an instance of a content record.

4. DETAILED DESCRIPTION

Figure 1:
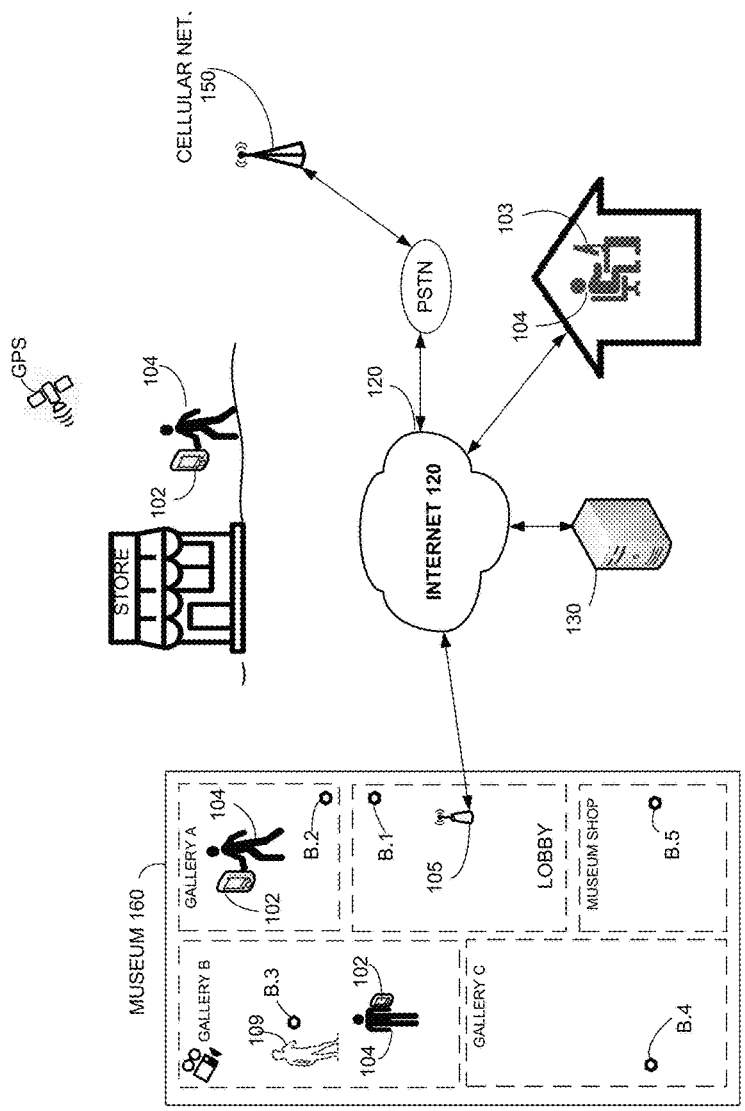
FIG. 1 illustrates the elements comprising a content delivery system 100.

Recently, some location aware content delivery systems have been designed to make use of preference information entered into an application by an individual and made available to the system. This preference information can be any one or more of a particular type of literature, food, art, entertainment, music, sport, or any other area of interest to a particular individual. In this regard, an individual can identify more than one type of literature, food, type of art, etc. about which they prefer to receive information. Such a content delivery system can use this preference information as a basis for determining what content should be delivered to an individual as they move proximate to a particular location. While location aware content delivery systems are able to identify a current location of a mobile device, and then operate to deliver content that is deemed germane to that location based upon individual preferences, the content that is delivered by such a system may or may not be of current interest to the individual, as the preference information available to the delivery system may not have been updated recently. And even if the preference information has been recently updated by the individual, and it is available to the content delivery system, the content delivery system may not know which of multiple preferences, of the same or dissimilar types, are more important than another preference of the same or dissimilar type preference, and so is not able to deliver content that is of the most current interest to the individual.

The limitations of prior art location aware content delivery systems are overcome in a location aware content delivery system that (1) detects information that is consistent with an instance of a particular type of mobile communication device user activity, each instance of activity associated with a particular known location, (2) determines and assigns a priority to each instance of the detected user activity with respect to each other instance of the user activity, and then (3) stores the prioritized user activity information with a pointer to at least one instance of media content. At a later time, and subsequent to storing the prioritized user activity, the content delivery system can operate to (4) detect a current location of the mobile communication device, (5) identify a plurality of instances of media content associated with the current mobile communication device location, (6) identify activities that relate to the identified instance of media content, and (7) deliver, to the mobile communication device, at least one instance of the media content that is pointed to by the highest priority instance of a user activity.

The activity based, location aware content delivery system can operate on information that is characteristic of a mobile device user activity to identify an instance of a user activity, determine what type of activity the user is engaged in with respect to the instance of the activity, and to determine and assign a priority for that instance of activity. Information that is characteristic of a user activity can be comprised of, but is not limited to, IPS and/or GPS location information corresponding to a mobile communication device at particular time, movement information corresponding to the location information, information relating to a user interaction with their mobile device that corresponds to the location and movement, the identity of an object or venue that corresponds to the location, and environmental image information captured by the mobile device. The mobile device user interaction information can be comprised of an interaction with a mobile network application, interaction with social, file sharing, bookmarking information. One or more of the location, movement, object/venue, environmental image and user-device interaction information can be employed by the system to identify a single instance of a user activity, and for each instance of an activity the system can determine what type of activity the user is engaged in, and the system can calculate a user importance value that is used to determine a priority for each instance of a user activity.

The above aspects, and other aspects, of an activity based, location aware content delivery system 100 are described as follows with reference to the figures, in which FIG. 1 illustrates an embodiment of the activity based, location aware content delivery system 100 (hereinafter referred to as the system 100) comprising one or more mobile communication devices 102, each under the control of a mobile device user 104, and each mobile device can connect to a wireless LAN 105, a cellular network 150, or any other appropriate communication network, in order to communicate with a network computational device, such as a network server 130. The system 100 can also receive information from an indoor positioning system or a geographic positioning system or both.

Each of the mobile communication devices 102 in FIG. 1 has a mobile application 200 (described later with reference to FIG. 2) that is configured to receive information that is indicative of a current geographic position of the device 102. This information can be received from an indoor positioning system (IPS), a geographic positioning system (GPS), or the mobile device 102 can have functionality that captures environmental image information using camera functionality that is integral to the device 102. The mobile application 200 is also configured to receive information that is indicative of device movement from a movement detection device 230, such as an accelerometer or the camera, operating on the mobile device 102. The position information (information indicative of a current geographic position) and the movement information (information indicative of device movement) can be periodically sent to a content delivery module 300 running on the network server 130 which can place a time stamp on the position and movement information at the time this information is received.

Alternatively, the mobile application 200 running on the mobile device 102, can be configured to process information received from the IPS, GPS or camera to determine a location of each mobile device 102, and the mobile application can be configured to operate on the movement information received from the accelerometer or camera to determine whether and for how long the mobile device is currently moving, or was moving in the past. A time stamp can be placed on the location and movement information at the time it is detected by the application 200, and the time stamped location and movement information can be periodically sent to the content delivery module 300 running on the network server 130.

Figure 2:
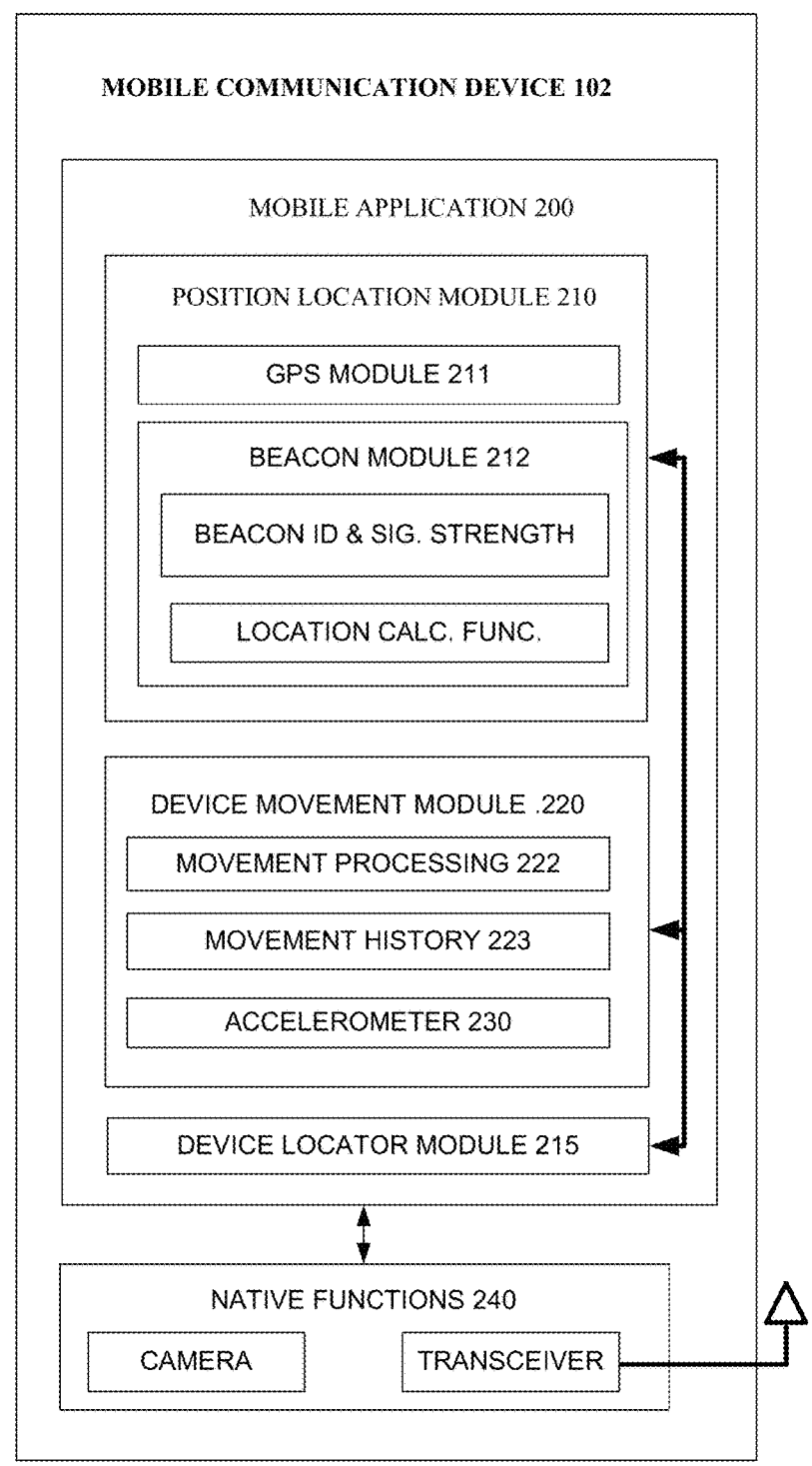
FIG. 2 shows the component parts of a mobile application 210.

Functional elements comprising the mobile communication device 102 are now described with reference to FIG. 2. A position location module 210 running in conjunction with the mobile application 200 generally operates to detect IPS and GPS signals, a device movement function 220 operates on information generated by an accelerometer 230 to determine whether the device 102 is moving and the rate of movement, or if the device is not moving, and native functionality 240 comprising integrated image capture functionality (i.e., a camera) and a transceiver that generally operates to capture, among other things, environmental image information and to transmit receive location, movement, image, voice, data and other information to the server 130. The mobile application 200 also has an optional device locator module 215 that can operate to receive information from the position location module 210, the device movement module 220 and the camera, and to process this information to determine a current geographic position of the device 102. The movement information can be maintained in a store 223 or immediately sent to the server 130. Information in IPS or GPS signals can be either processed by the device locator module 215 or sent to the server 130 for processing in order to determine a current location of the mobile device.

The functional elements comprising the content delivery module 300 operating in conjunction with the network server 130 are illustrated with reference FIG. 3. Generally, the content delivery module 300 operates to detect and maintain a plurality of instances of activities engaged in by a mobile device user at one or more locations. The module 300 can detect an activity that a mobile device user is engaged in that in some manner relates to one or more objects at a particular location, or the module 300 can detect activity of a general nature in which the mobile device user is engaged in, and each instance of an activity that is identified/detected can be maintained in a store associated with an activity identification function 340 for later use. The module 300 can use information comprising a current mobile device location as a key to identify one or more previously detected instances of an activity to determine which of a plurality of instances of the second type of media content is appropriate to be delivered to the mobile device user at their current location and which the user is interested in receiving.

The content delivery module 300 is comprised of venue or object location maps 310A, 310B and 32C that respectively associate a known outdoor, indoor location or an image with an object or a venue. A venue can be a special or general purpose structure that has a footprint defined by a range of geographic position coordinates, and an object can be anything (inanimate or animate) that is visible or tangible to an individual, such as a work of art or any other man-made object or object of manufacture. The module 300 has a locator function 320 that is comprised of functionality that operates to process information received from the mobile device 102 that is indicative of the mobile device location, and it has a listing of mobile devices currently connected to the server 130. The module 300 has a device movement function 330, it has an activity identification function 340, and it has functionality 350 that operates to select for delivery to a mobile device any one or more of a plurality of content instances maintained in a store 351 described later with reference to FIG. 7.

Figure 3:
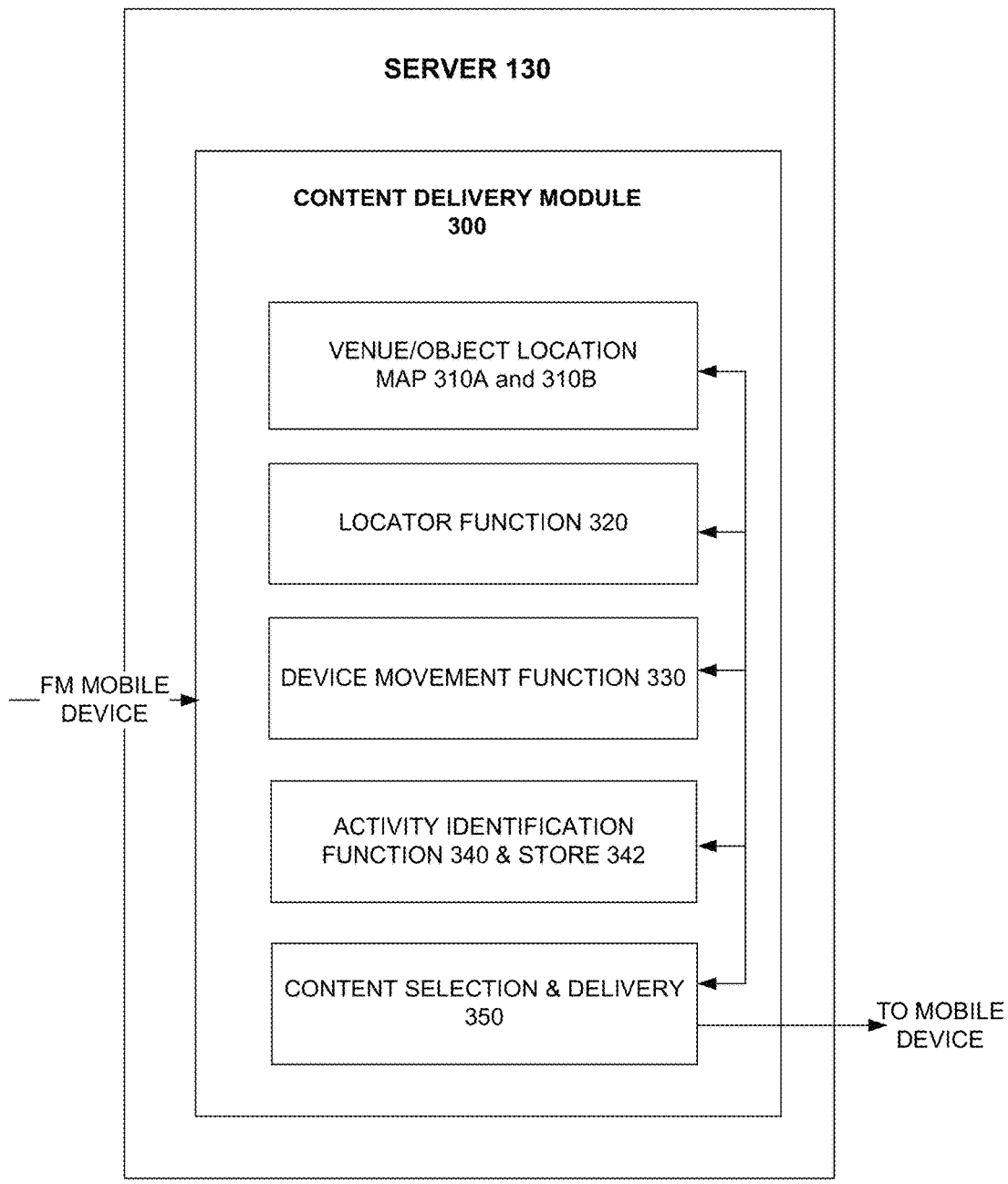
FIG. 3 shows functional components comprising a content delivery module 300 running on a server 130.

Continuing to refer to FIG. 3, the venue/object location maps 310A, 310B and 310C have a listing of the identities of some or all of the objects on display at a venue, and associated indoor (IPS), outdoor (GPS) or image (camera) information. This IPS information can be the identity of one or more beacons of a known location that are proximate to each object. According to one embodiment, one beacon is positioned proximate to each object on display in the venue, and so the location of the object is determined by the identity of that beacon. According to another embodiment, one or more beacons are positioned proximate to each object, and so the location of each object in the museum is determined by beacon signal strength measurements. Signal strength measurements received from one or more beacons proximate to each displayed object can be recorded and entered into the map in association with that object. Each beacon is assigned a unique identifier that a beacon periodically transmits in a low power signal. A mobile device that is configured to receive a beacon signal can determine the identity of each beacon using this unique identifier, and by detecting a beacon signal strength is able to determine how far the object is from each of one or more beacons. This distance information is then stored in the map in association with the object that is positioned proximate to the location in which the beacon signal strength is recorded. It should be understood, that while the embodiment described herein uses beacon technology as a means to determine an interior location, other interior location systems can also be employed for this purpose.

With continued reference to FIG. 3, the mobile device locator function 320 operates to detect/determine and store either or both of an interior location and an exterior location of a mobile device, such as any of mobile devices 102 in FIG. 1, it can maintain a time or times during which the mobile device is determined to be at a location, and it detects and maintains a listing of the mobile devices that are currently connected to the server 130. Depending upon the correspondence of beacons to displayed objects (one beacon proximate to one object or multiple beacons proximate to one object), the locator function 320 can receive information that uniquely identifies a particular beacon, and it can received signal strength information corresponding to multiple beacons as measured by a mobile device, and in one embodiment the locator function operates to place a time stamp on the information as it is received. The locator function can use this beacon identity and signal strength information to determine the interior location of the mobile device at a particular time, and then store this location and time information. The locator function can also receive GPS location information and/or environmental image information from the mobile device, place a time stamp of the information and store it.

The device movement function 330 in FIG. 3 operates to receive and maintain motion information generated by an accelerometer operating on a mobile device, or alternatively, it can access a sequence of images captured by the mobile device at known times at known locations and maintained by the locator function 320. The motion information generated by the accelerometer on the mobile device can be comprised of a current rate of movement of the mobile device and time stamp information. The mobile device can place a time stamp on this movement information at the time it is generated, or a time stamp can be placed on this information at the time it is received by the function 320. This movement information can be stored, and both this movement information and the stored location information can be operated on by logic 341 comprising the activity identification function 340, shown with reference to FIG. 6B, to detect one or more instances of a user activity and to determine what type of activity a mobile device user is engaged in during the time the mobile device user is determined to be at a particular location at a particular time. More specifically, a particular type of activity can be characterized by a pattern of motion and/or a pattern of interaction (including the number of instances, type of interaction, and duration of interaction) with a network based application for a particular period of time at a particular location, and the pattern of motion or application interaction for the particular period of time at the particular location can be operated on by the logic 341 to identify a particular type of activity, and this identified instance of an activity can be maintained in a store 342 for later use. Types of user activity can include, but are not limited to, viewing a particular object without moving for a particular period of time, viewing the object without moving and at the same time interacting with a network application running on a mobile device, moving slowly or rapidly through an area/location while interacting or not interacting with the network application, or any combination of the preceding. Further, a user interest value calculation function 344 comprising the activity identification function 340 can examine time stamp information associated with the location, movement ,and user interaction information and use this timestamp information to determine a period of time that the mobile device user is engaged in a particular activity, and then use this time period information and other information (i.e., interaction with social media application or any other communication application) to quantify or calculate a user interest value associated with the instance of the activity.

Equation 1 is illustrative of one means that can be employed to calculate a user interest value for an activity.

$$UIV=(DT \div TAT)+UI \quad \text{Equation 1:}$$

UIV=User Interest Value
DT=Dwell Time proximate to a single known location
TAT=Total Activity Time
UI=User Interaction with Mobile Device According to Equation 1, the Dwell Time is the period of time a user is detected to occupy a particular location or is proximate to an object of known location comprising either location map 310A, 310B or 310C. The Total Activity Time is a value arrived at by adding dwell times for each instance of an activity engaged in by a mobile device user at a known venue. The user interaction value is arrived at by counting (by the activity identification function 340) the number of times a user interacts with their mobile device while at the location corresponding to the activity. Equation 1 can be modified in a number of different ways. In one embodiment, the UI value can be weighted differently depending upon what type of interaction the user has with their mobile communication device. One type of interaction is the number of comments the user enters into a communication application during the time they are engaging in the activity. Another type of interaction is the number of positive comments the user enters, the number of negative comments the user enters or the number of times the user shares some aspect of the subject matter corresponding with the activity with one or more friends. Each of these types of interactions can be weighted differently depending upon their importance to calculating the user interest value. In another embodiment, In another embodiment, the UI value can optionally be multiplied by an interaction duration time factor, which can have a value that is a period of time that a user engages in each interaction with an application.

The user interest value can be stored with an instance of a user activity maintained in the store 342 and used to determine a priority of some or all of the plurality of instances of the activities with respect to any other one of the plurality of the instances of the activities. After identifying an instance of a user activity, content pointer determination logic 343 running in conjunction with the activity identification function 340 can examine the subject matter of the activity (location, object/venue ID, meta data relating to the object/venue, user application interaction) in the store 342, and compare one or more key words comprising this subject matter to subject matter comprising each of a plurality of content records comprising a store of the media content 351 maintained in the content selection and delivery module 350. At least a highest scoring match between the activity and an instance of media content 351 is identified, and a pointer to the identified instance of media content can be added to the activity file or record maintained in the store 342.

Each one of the locator function 320, the device movement function 330 and the activity identification function 340 can maintain information about a plurality of mobile device users, and the information associated with each user can be maintained in a separate file, or each user can be assigned a unique label or identity, and each instance of information associated with a particular user can have the unique label or identity.

Continuing to refer to FIG. 3, the content selection and delivery module 350 generally operates to identify one or more instances of media content 351 that a mobile device user may be interested to receive based upon their current location and past activity. Each instance of the media content 351 has a unique identity and can be included in a separate file or record that comprises information (text, audio, video, or other subject matter content) that may be of interest to a mobile device user. An instance of media content 351 delivered to the mobile device user by the content delivery module 300 can be an electronic coupon or an offer to discount a product or service that relates in some manner to past activity the mobile device user was engaged in. The media content 351 that is delivered can comprise instructions to go to a particular web page to view product coupon or discount information, or the media content 351 can include a prompt to check a product or service purchase opportunity while the mobile device user is proximate to a particular location. In operation, a logical process running in association with the module 350 periodically detects the current location of all mobile devices that are running the mobile application 200 described with reference to FIG. 2. When the module 350 detects that a mobile device is proximate to a location that corresponds to a deliverable instance of media content maintained in the store 351, it determines which instance of media content may be of priority interest to the mobile device user, then and delivers this content.

The functional elements comprising the content delivery module 300 are shown and described in more detail with reference to the following figures, in which FIGS. 4A, 4B and 4C show the format of indoor and outdoor location maps and indoor/outdoor object location maps respectively. Object and/or venue and location information comprising each map can be used by the activity identification function 340 to identify the object and location of a particular instance of an activity, and used to determine what type of activity a mobile device user is engaged in (i.e., viewing a particular object). Each map has a listing of known beacon identities (and associated known locations), GPS locations or captured images and corresponding objects or venues. As previously described, one or more beacons can be positioned proximate to an object, and a unique identifier in a beacon signal can be used by the device locator function 320 running in the content delivery module 300 to identify the location of a mobile device user at any particular time.

Figure 5:
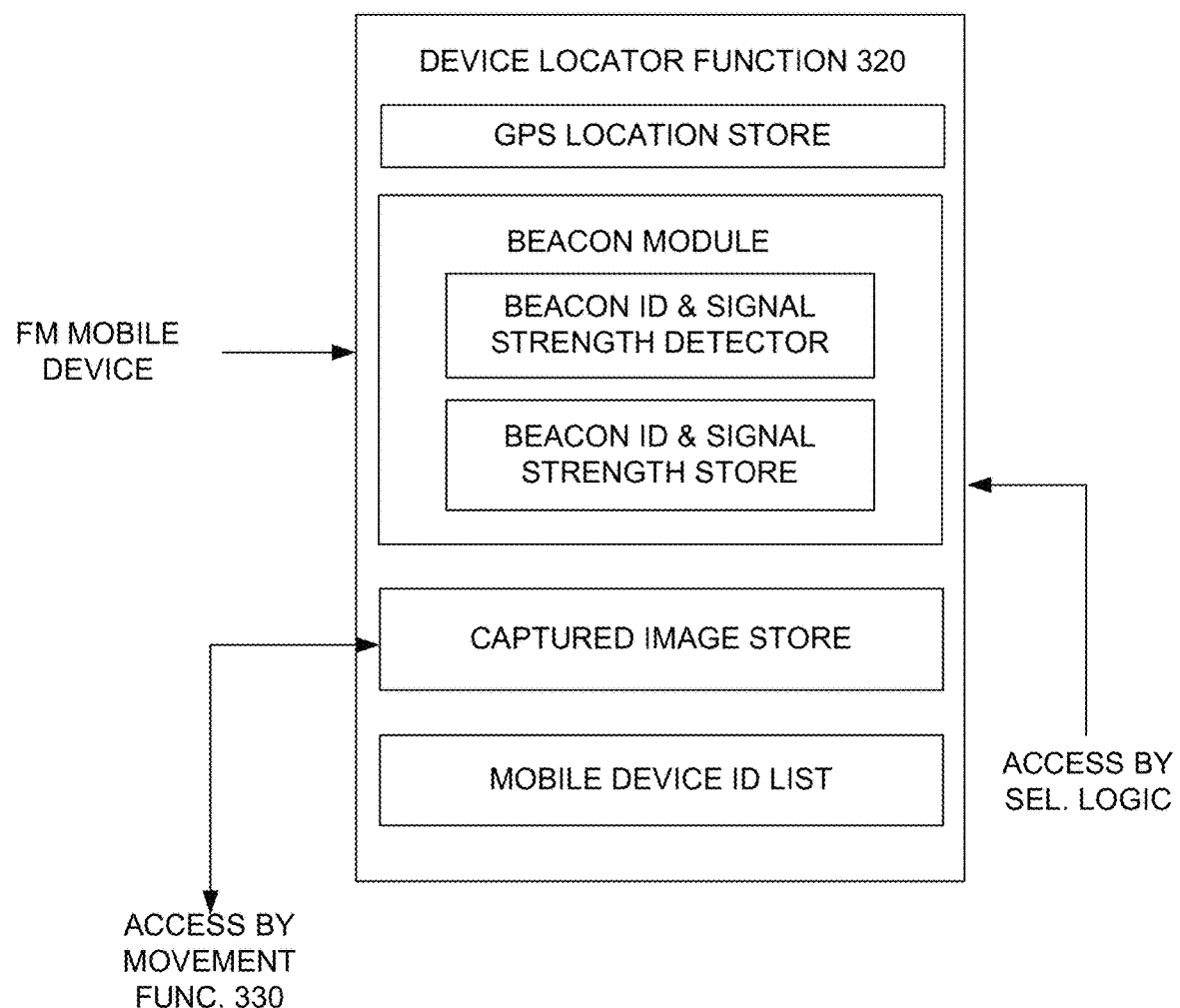
FIG. 5 is a diagram showing functional blocks comprising a device locator function 320.

The device locator function 320, shown in FIG. 5, is comprised of a GPS location store, a beacon module, a store of captured images all received from a mobile communication device, and a listing of mobile communication devices that are actively running the mobile application 200. The GPS location store maintains GPS location information received from each mobile device. The beacon module is comprised of a beacon ID and signal strength detector and a beacon ID and signal strength store. The signal strength detector can operate to determine a distance from a mobile device to a beacon at a particular time, and this information can be maintained in the store for later use. The captured image store maintains a recent history of image information captured by the mobile communication device and sent to the content delivery module 300 running on the server 130. As described earlier, a time stamp can be assigned to each image and maintained in association with each image in the captured image store.

Figure 6A:
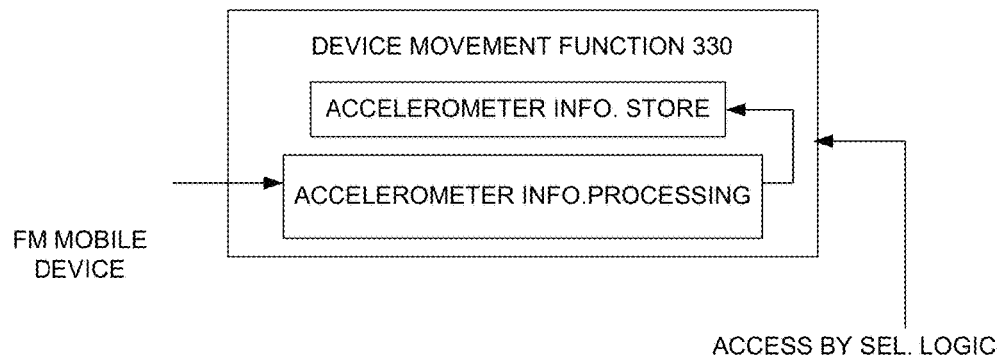
FIG. 6A is a diagram showing functional blocks comprising a device movement function 330.
Figure 6B:
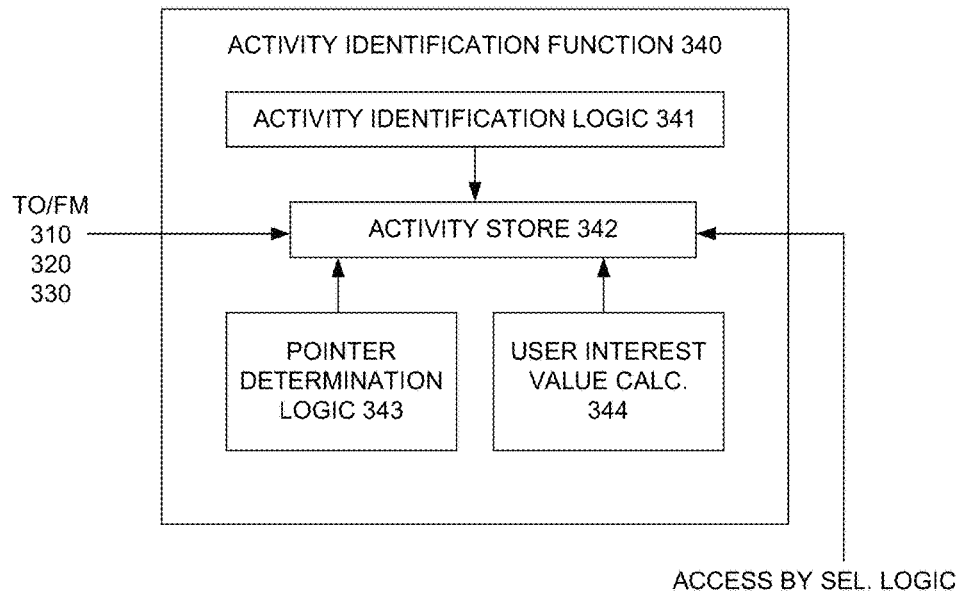
FIG. 6B is a diagram showing functional blocks comprising an activity identification function 340.

The device movement function 330, shown in FIG. 6A, receives accelerometer information from a mobile device, or accesses the captured image information maintained in the device location function 320, and processes it to determine the rate of movement of the device at the time the accelerometer detected a movement. This movement and time information is maintained in the store for later use.

Figure 7:
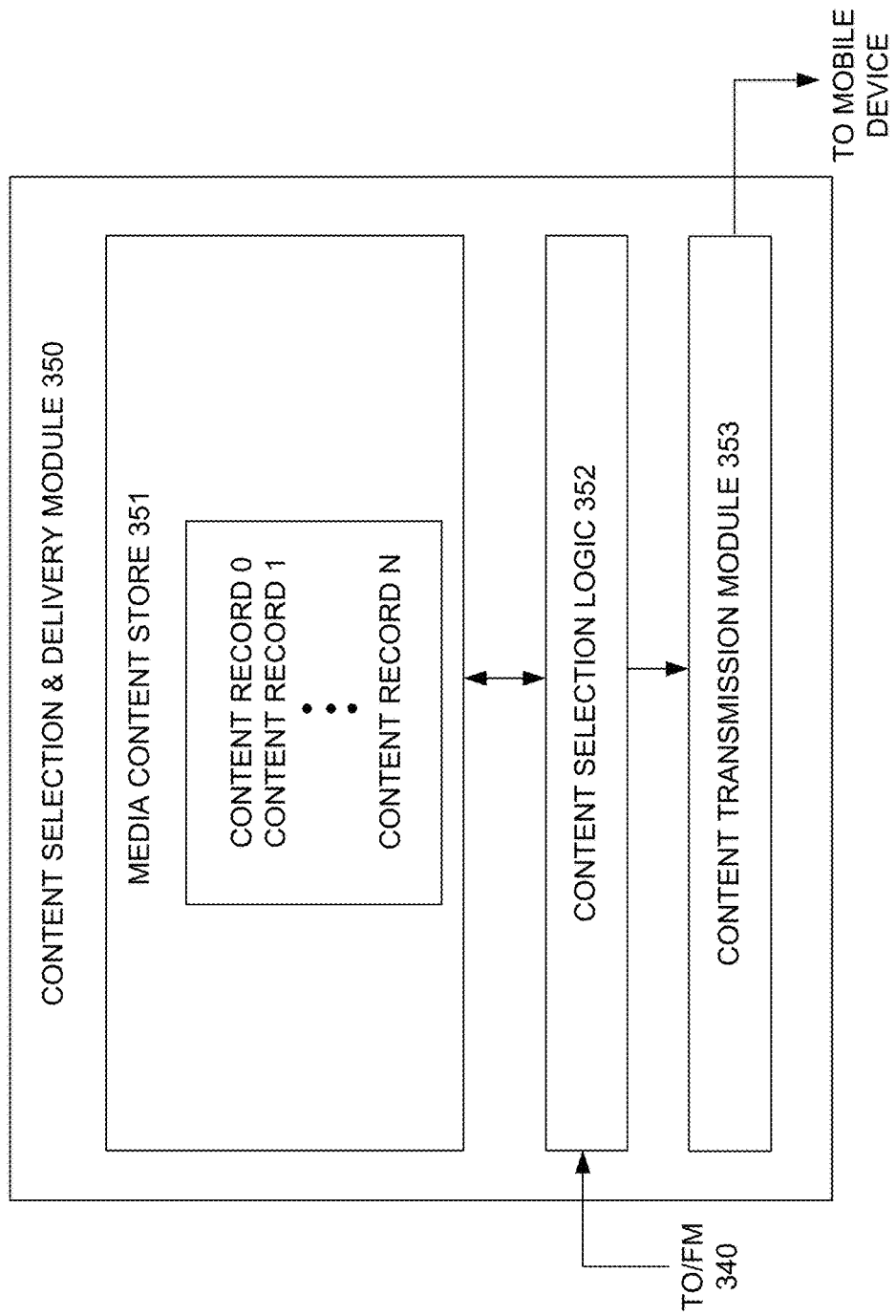
FIG. 7 is a diagram showing functional blocks comprising a content selection and delivery module 350.

Referring now to FIG. 7, the content selection and delivery module 350 is comprised of a media content store 351 having a plurality of instances or records comprising a plurality of instances of media content (records) information, it has content selection logic 352 and a content transmission module 353. Each instance of a content record can relate to a known outdoor geographic location or indoor location (such as a museum shop for instance), and can comprise subject matter of interest to a mobile device user. This subject matter can be a coupon for the purchase of a product or service, it can comprise an offer to discount a product or service, or it can be an invitation to visit a web site to obtain a coupon or discount on a product or service. The subject matter of each content record can be different than the subject matter of each of the other content records, or it can be similar to one or more other content records. For example, a first content record can be a coupon to purchase an item/product at a particular price, and a second content record can be a coupon to purchase the same item/product at a particular price that is more or less than the coupon corresponding to the first content record. The selection of any one or more of an instance of the media content for delivery can depend upon a current location of mobile device user and a user interest value associated with each instance of a user activity. The content selection logic 352 comprises computer instructions that operate on information comprising each instance of the media content stored in the media content store 351, and information stored in an instance of activity maintained by the activity identification function 340 to identify an instance of the media content that is currently of most interest to a mobile device user.

Specifically with regard to the operation of the content selection logic 352, and as generally shown with reference to FIG. 8, the logic at 800 periodically checks the current location of a mobile device that is configured to run the mobile application 200. The current location of the mobile device can be determined by its proximity to a beacon, GPS coordinates or by captured image information, or by content viewed by a user of the mobile application 200. In this regard, the user does not necessarily need to be within a minimum specified range of the beacon, but if the content being viewed by the user corresponds to content proximate to the beacon, the logic can determine that the user is proximate to an object associated with the beacon. Then at 801, the logic operates to examine all content records maintained in the store 351 to identify those records that correspond to the current mobile communication device location determined in (800). At 802, the logic 352 examines each content record in the store 351 for subject matter information (key words for instance) that can be utilized to identify one or more instances of a mobile device user activity maintained in the store 342 in association with the activity identification function 340. If at least one, but typically more than one, instance of a user activity is identified, then at 803 the logic examines each identified activity for the one with the highest user interest value (i.e., highest priority), and then at (804) uses the pointer comprising this identified highest priority activity as a key to locate an instance of media content that the mobile communication device user is probably most interested in receiving, and finally at (805) the logic initiates the delivery of this media content to the mobile communication device.

FIGS. 9A and 9B illustrate the different types of information that can comprise an instance of a user activity and a content record respectively. FIG. 9A shows an instance of a user activity 900, maintained in the activity store 342 comprising the activity identification function 340, having a plurality of different types of information that is characteristic of this particular activity. In this case, the activity instance 900 has information that relates to the geographic location that the activity is engaged in by a mobile device user, it has information relating to an object at that location or information relating to a venue, it has time stamp information that identifies a time or period of time that the user is engaged in the activity, it has mobile device user movement information, it can have a record of the mobile device user interaction with the mobile device, and it can have one or more pointers to one or more instance of a content record maintained in a store 351. FIG. 9b shows an instance of a media content record 910 maintained in the store 351 comprising the content selection and delivery module 350. This record has a unique identity, it has a geographic location that corresponds to a current location of a mobile device user in order to receive the content, and the record has media content subject matter (i.e., electronic coupon or an offer to discount a product or service) that can be delivered to the user when they occupy the related location. This subject matter can be textual, audio, video, a URL, pictures, or any combination of one or more of this subject matter.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method of delivering media content, comprising:
maintaining, by a content delivery process running on a computational device connected to a network, a plurality of media content instances each one of which is associated with a particular location;
receiving, by the content delivery process, information that is indicative of a current location of a mobile communication device, and using this current location information to identify one or more of the plurality of the media content instances having a location that corresponds to the current location of the mobile communication device;
using information in each one of the plurality of the media content instances to identify a plurality of prioritized activity previously engaged in by a user of the mobile communication device and maintained by the content delivery process, each of the identified plurality of prioritized instances of user activity having a pointer to an instance of the media content;
determining, by examining a calculated user interest value associated with each of the identified plurality of prioritized instances of user activity, that at least one instance of user activity is of higher priority than all of the other plurality of the identified instances of the user activity, the user interest value being calculated using a dwell time proximate to a single known location, a total activity time and the number of user interactions with mobile communication device; and
using the pointer in the identified highest priority instance of user activity of identify an instance of the media content, and delivering the identified instance of the media content to the mobile communication device.

2. The method of claim 1, wherein the calculated user interest value is weighted according to a type of interaction the mobile communication device user engages in with their mobile communication device.

3. The method of claim 2, wherein the type of interaction is weighted according to how many comments a user enters into their mobile communication device during a time that they are engaged in an instance of an activity.

4. The method of claim 3, wherein the type of interaction is weighted according to how many positive or negative comments a user enters into their mobile communication device during a time that they are engaged in an instance of an activity, or according to how many time the user shares the subject matter associated with the activity with one or more friends.

5. The method of claim 1, wherein each of the media content instances comprises subject matter information relating to media content subject matter information and a known geographic position.

6. The method of claim 5, wherein the media content subject matter is textual, visual, video or audio information or any combination of textual, audio, video and visual information.

7. The method of claim 1, wherein the information that is indicative of a current location of a mobile communication device comprises information received from an indoor or outdoor positioning system or environmental imaging information.

8. The method of claim 1, wherein the at least one instance of the activity previously engaged in by the mobile communication device user is characterized by any one or more of location information corresponding to a mobile communication device at a particular time, movement information corresponding to the location information, information relating to a user interaction with their mobile device that corresponds to the location and movement information, the identity of an object or venue that corresponds to the location information, environmental image information captured by the mobile communication device and a pointer to an instance of the media content.

9. The method of claim 8, wherein the content delivery process operates on any one or more of the characteristics to identify the instance of the activity.

10. Content delivery system, comprising:
a computational device that is connected to a network and which maintains a plurality of instances of media content, the computational device running a content delivery process that operates to receive information indicative of a current location from a mobile communication device over the network, and which operates to identify two or more instances of the plurality of the stored media content corresponding to the current location, the content delivery process using information comprising each one of the two or more identified instances of media content to identify a plurality of prioritized instances of mobile communication device user activity, each having a pointer to an instance of the stored media content; and
employing the pointer comprising a highest priority of the two or more identified instances of the user activity to identify at least one of the plurality of instances of the media content, and sending the identified at least one instance of media content to the mobile communication device;
wherein, the highest priority instance of the user activity is determined by examining a calculated user interest value associated with each of the identified plurality of prioritized instances of user activity, and the user interest value is calculated using a dwell time proximate to a single known location, a total activity time, and the number of user interactions with a mobile communication device.

\* \* \* \* \*